US012745069B2

(12) United States Patent
Sha et al.

(10) Patent No.: US 12,745,069 B2
(45) Date of Patent: Sep. 22, 2026

(54) METHOD AND APPARATUS FOR SERVICE SWITCH BETWEEN UES, AND STORAGE MEDIUM

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Li Niu, Shenzhen (CN); Jie Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 18/687,282

(22) PCT Filed: Apr. 28, 2022

(86) PCT No.: PCT/CN2022/090060
§ 371 (c)(1),
(2) Date: Feb. 27, 2024

(87) PCT Pub. No.: WO2023/029537
PCT Pub. Date: Mar. 9, 2023

(65) Prior Publication Data

US 2024/0373335 A1 Nov. 7, 2024

(30) Foreign Application Priority Data

Sep. 3, 2021 (CN) ......................... 202111033623.5

(51) Int. Cl.
*H04W 8/00* (2009.01)
*H04L 5/00* (2006.01)
(Continued)

(52) U.S. Cl.
CPC ............. *H04W 8/00* (2013.01); *H04L 5/0055* (2013.01); *H04W 48/18* (2013.01); *H04W 68/02* (2013.01); *H04W 76/12* (2018.02); *H04W 76/32* (2018.02)

(58) Field of Classification Search
CPC ....... H04W 8/00; H04W 48/18; H04W 68/02; H04W 76/12; H04W 76/32; H04W 88/08;
(Continued)

(56) References Cited

U.S. PATENT DOCUMENTS 10,736,155 B2 8/2020 Dao et al.
2010/0279670 A1* 11/2010 Ghai ..................... H04L 65/102 455/414.3

(Continued)

FOREIGN PATENT DOCUMENTS

CN 103139139 A 6/2013
CN 106507267 A 3/2017

(Continued)

OTHER PUBLICATIONS

International Search Report and Written Opinion for International Application No. PCT/CN2022/090060, mailed Jul. 6, 2022.

(Continued)

*Primary Examiner* — Mazda Sabouri
(74) *Attorney, Agent, or Firm* — Wolf, Greenfield & Sacks, P.C.

(57) ABSTRACT

A method and apparatus for service switch between UEs, and a storage medium. The method for service switch between UEs includes: a target User Equipment (UE) sends service switch-related information to a base station, where the service switch-related information is used to indicate switching of first service data from a source UE to the target UE, and the source UE and the target UE belong to a same Personal Internet of Things (PIoT) (S210); and the target UE receives the first service data sent by the base station, where a GTP-U tunnel of the target UE and a GTP-U tunnel of the source UE are associated with a same Protocol Data Unit (PDU) session (S220).

18 Claims, 7 Drawing Sheets

A target UE sends service switch-related information to a base station, where the service switch-related information is configured to indicate switching of first service data from a source UE to the target UE, and the source UE and the target UE belong to a same PIoT — S210

The target UE receives the first service data sent by the base station, where a GTP-U tunnel of the target UE and a GTP-U tunnel of the source UE are associated with a same PDU session — S220

(51) Int. Cl.
*H04W 48/18* (2009.01)
*H04W 68/02* (2009.01)
*H04W 76/12* (2018.01)
*H04W 76/32* (2018.01)

(58) Field of Classification Search
CPC ....... H04W 4/70; H04W 76/11; H04W 76/22; H04W 88/02; H04L 5/0055; H04L 67/148; Y02D 30/70
See application file for complete search history.

(56) References Cited

U.S. PATENT DOCUMENTS

2011/0310824 A1* 12/2011 Perras ................ H04L 65/1083 370/329
2012/0011257 A1* 1/2012 Kim .................... H04L 65/1093 709/227
2012/0131134 A1* 5/2012 De Foy ............... H04L 65/1083 709/217
2013/0322312 A1* 12/2013 Kim .................... H04L 65/1093 370/310
2014/0258412 A1 9/2014 Li et al.
2014/0293837 A1* 10/2014 Kim .................... H04L 65/1016 370/259

FOREIGN PATENT DOCUMENTS

CN 111480366 A 7/2020
CN 113741762 A 12/2021

OTHER PUBLICATIONS

[No Author Listed] 3GPP TSG RAN Rel-18 Workshop Agenda item 4.2, R18 Personal IoT network considerations. RWS-210060. Jun. 28, 2021-Jul. 2:1-7.
Extended European Search Report for European Application No. 22862680.0, dated Aug. 1, 2025.
[No Author Listed], 3rd Generation Partnership Project; Technical Specification Group Services and System Aspects; IP Multimedia Subsystem (IMS) Service Continuity; Inter-UE Transfer enhancements; Stage 2 (Release 10). 3GPP Standard; 3GPP TR 23.831 V0.4.0. May 2010;1-80.
[No Author Listed], 3rd Generation Partnership Project; Technical Specification Group Core Network; General Packet Radio Service (GPRS); GPRS Tunnelling Protocol (GTP) across the Gn and Gp interface (Release 5). 3GPP Standard; 3GPP TS 29.060 VS.14.0, Sep. 2005:1-96.
[No Author Listed], Series Y: Global Information Infrastructure, Internet Protocol Aspects and Next-Generation Networks. Next Generation Networks—Frameworks and functional architecture models. ITU-T Y.2060, Overview of the Internet of things; Jun. 2012; 1-22.

* cited by examiner

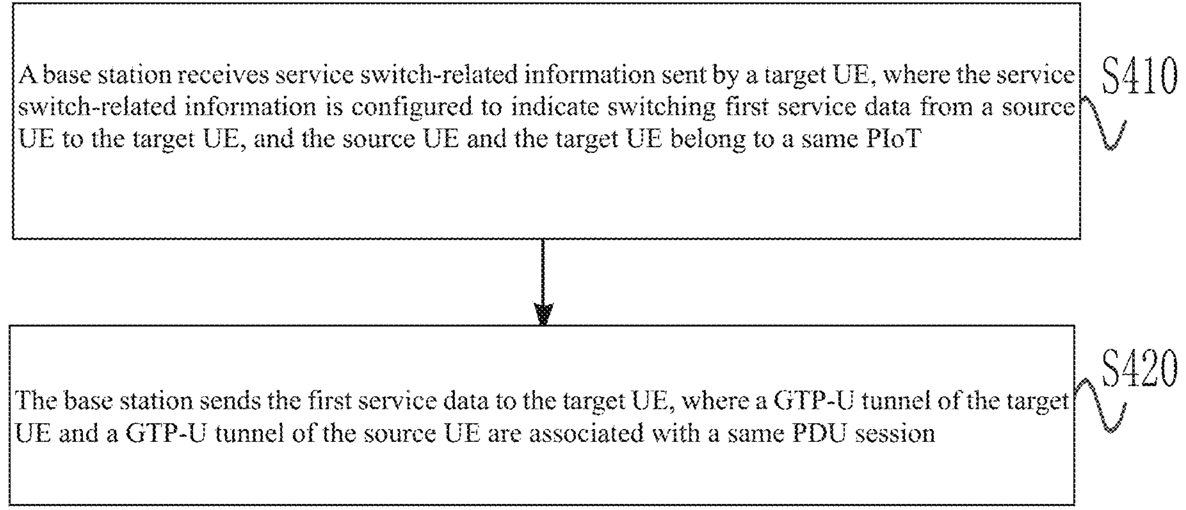

FIG. 4

A core network device receives service switch-related information, where the service switch-related information is configured to switch first service data from a source UE to a target UE

S510

The core network device associates a GTP-U tunnel of the target UE and a GTP-U tunnel of the source UE with a same PDU session when determining that the source UE and the target UE belong to a same PIoT

METHOD AND APPARATUS FOR SERVICE SWITCH BETWEEN UES, AND STORAGE MEDIUM

CROSS-REFERENCE TO RELATED APPLICATION

This application is a national stage filing under 35 U.S.C. § 371 of international application number PCT/CN2022/090060, filed Apr. 28, 2022, which claims priority to Chinese patent application 202111033623.5, filed Sep. 3, 2021. The contents of these applications are incorporated herein by reference in their entirety.

TECHNICAL FIELD

The present disclosure relates to mobile communication technology, for example, to a method and apparatus for service switch between UEs, and a storage medium.

BACKGROUND

With the popularization of wireless communication technology, it is very common for a single user to have multiple User Equipments (UEs). Among them, some UEs (such as computers, televisions, tablet computers, etc.) provide satisfactory user look and feel experience and have low demand for energy conservation, but are not very convenient to move, while some UEs (such as smart UEs) are convenient to move, but have high demand for energy conservation.

A user may need to switch the same service between different UEs during use. For example, the user watches a video indoors through a computer connected to a wireless network, and when the user moves from indoors to outdoors, a video service needs to be switched to a smart phone. However, switching the service between different UEs may lead to the interruption or discontinuity of the service, affecting the user experience.

SUMMARY

The present disclosure provides a method and apparatus for service switch between UEs, and a storage medium, which implements smooth switch of a service between UEs of a user.

In accordance with a first aspect of the present disclosure, an embodiment provides a method for service switch between UEs, which may include:

sending, by a target UE, service switch-related information to a base station, where the service switch-related information is used to indicate switching of first service data from a source UE to the target UE, and the source UE and the target UE belong to a same Personal Internet of Things (PIoT); and receiving, by the target UE, the first service data sent by the base station, where a GPRS Tunneling Protocol-User Plane (GTP-U) tunnel of the target UE and a GTP-U tunnel of the source UE are associated with a same Protocol Data Unit (PDU) session.

In accordance with a second aspect of the present disclosure, an embodiment provides a method for service switch between UEs, which may include:

sending, by a source UE, service switch indication information to a base station or a Core Network (CN), where the service switch indication information is used to indicate switching of first service data from the source UE to a target UE;

receiving, by the source UE, a link deletion message or a radio bearer deletion indication sent by a base station to which the target UE is connected, where the link deletion message includes a Non-Access Stratum (NAS) identifier of the source UE or a PIoT terminal identifier; and deleting, by the source UE, a Uu link between the source UE and the base station to which the source UE is connected or a radio bearer corresponding to a switched service.

In accordance with a third aspect of the present disclosure, an embodiment provides a method for service switch between UEs, which may include:

receiving, by a base station, service switch-related information sent by a target UE, where the service switch-related information is used to indicate switching of first service data from a source UE to the target UE, and the source UE and the target UE belong to a same PIoT; and sending, by the base station, the first service data to the target UE, where a GTP-U tunnel of the target UE and a GTP-U tunnel of the source UE are associated with a same PDU session.

In accordance with a fourth aspect of the present disclosure, an embodiment provides a method for service switch between UEs, which may include:

receiving, by a CN device, service switch-related information, where the service switch-related information is used to indicate switching of first service data from a source UE to a target UE; and associating, by the CN device, a GTP-U tunnel of the target UE and a GTP-U tunnel of the source UE with a same PDU session in response to determining that the source UE and the target UE belong to a same PIoT.

In accordance with a fifth aspect of the present disclosure, an embodiment provides a UE which is a target UE, which may include:

a sending module configured to send service switch-related information to a base station, where the service switch-related information is used to indicate switching of first service data from a source UE to the target UE, and the source UE and the target UE belong to a same PIoT; and a receiving module configured to receive the first service data sent by the base station, where a GTP-U tunnel of the target UE and a GTP-U tunnel of the source UE are associated with a same PDU session.

In accordance with a sixth aspect of the present disclosure, an embodiment provides a UE which is a source UE, which may include:

a sending module configured to send service switch indication information to a base station or a CN, where the service switch indication information is used to indicate switching of first service data from the source UE to a target UE;

a receiving module configured to receive a link deletion message or a radio bearer deletion indication sent by a base station to which the target UE is connected, where the link deletion message includes an NAS identifier of the source UE or a PIoT terminal identifier; and a connection module configured to delete a Uu link between the source UE and the base station to which the source UE is connected or a radio bearer corresponding to a switched service.

In accordance with a seventh aspect of the present disclosure, an embodiment provides a base station, which may include:

- a receiving module configured to receive service switch-related information sent by a target UE, where the service switch-related information is used to indicate switching of first service data from a source UE to the target UE, and the source UE and the target UE belong to a same PIoT; and
- a sending module configured to send the first service data by the base station to the target UE, where a GTP-U tunnel of the target UE and a GTP-U tunnel of the source UE are associated with a same PDU session.

In accordance with an eighth aspect of the present disclosure, an embodiment provides a CN device, which may include:

- a receiving module configured to receive service switch-related information, where the service switch-related information is used to indicate switching of first service data from a source UE to a target UE; and
- a processing module configured to associate a GTP-U tunnel of the target UE and a GTP-U tunnel of the source UE with a same PDU session in response to determining that the source UE and the target UE belong to a same PIoT.

In accordance with a ninth aspect of the present disclosure, an embodiment provides a storage medium, containing a computer-executable instruction which, when executed by a computer processor, caused the processor to implement the method for service switch between UEs in any implementation of the first aspect to the fourth aspect.

According to the method and apparatus for service switch between UEs, and storage medium provided by embodiments of the present disclosure, a target UE sends, to a base station, service switch-related information configured to indicate switching of first service data from a source UE to the target UE, and the target UE receives the first service data sent by the base station, where a GTP-U tunnel of the target UE and a GTP-U tunnel of the source UE are associated with a same PDU session, and the source UE and the target UE belong to a same PIoT, thereby achieving smooth switch of a service between UEs belonging to the same user.

BRIEF DESCRIPTION OF DRAWINGS

FIG. 4 is a flowchart of another method for service switch between UEs provided by an embodiment of the present disclosure;

FIG. 5 is a flowchart of another method for service switch between UEs provided by an embodiment of the present disclosure;

DETAILED DESCRIPTION

Embodiments of the present disclosure will be described in detail below in conjunction with the accompanying drawings.

Figure 1:
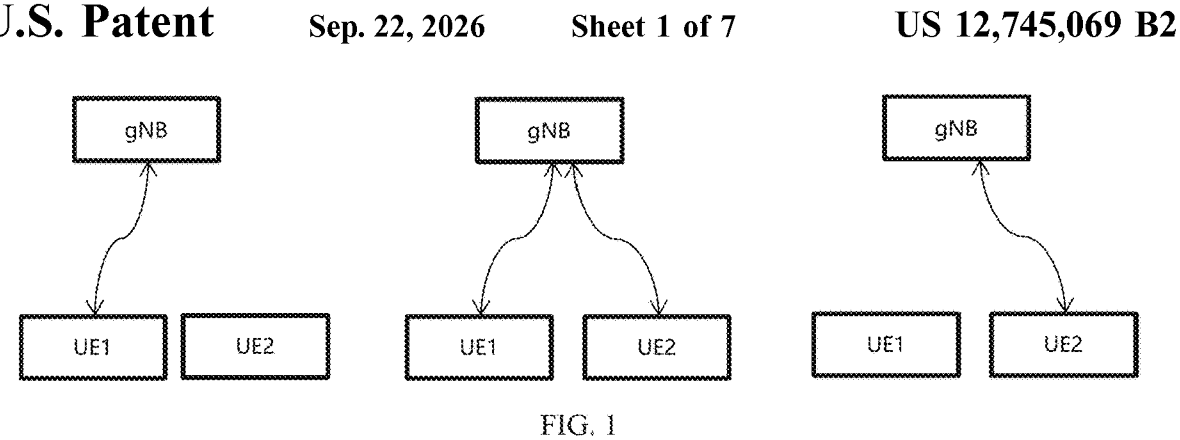
FIG. 1 is a schematic diagram of service switch between different equipment under a same base station.

When a service needs to be switched between multiple UEs belonging to a user, in order to improve the service experience, the service needs to be smoothly switched between different UEs to improve the user experience. To achieve service continuity when the service is switched between UEs, it is necessary to first establish a radio link or radio bearer between a base station and a target UE, and then delete a radio link or radio bearer between a source UE and the base station to achieve smooth service switch. FIG. 1 is a schematic diagram of service switch between different UEs under the same base station. FIG. 1 shows on the left a radio link between UE 1 and a base station (gNB), which carries a service. When a user wants to switch the service from UE 1 to UE 2, a radio connection is first established between UE 2 and the gNB (as shown in the middle of FIG. 1), and then the radio link between UE 1 and the gNB is deleted after the service runs in UE 2 (as shown in the right of FIG. 1). A schematic diagram of service switch in the same gNB is shown in FIG. 1, and service switch between different gNBs is similar. According to the method for service switch between UEs provided by an embodiment of the present disclosure, the specific implementation method about how to achieve service switch between different UEs shown in FIG. 1 is illustrated in detail.

In the embodiments of the present disclosure, the source UE represents a UE before service switch, the target UE represents a UE to which the service is switched, and the source UE and the target UE may be any UE having network connection capability. The service switch from the source UE to the target UE may be triggered by the source UE or the target UE. The source UE and the target UE belong to a same user, that is, the source UE and the target UE belong to a same PIoT. In this way, there is no need to perform user login, authentication, and other processing again during service switch between the source UE and the target UE, thus ensuring the continuity of service switch.

Figure 2:
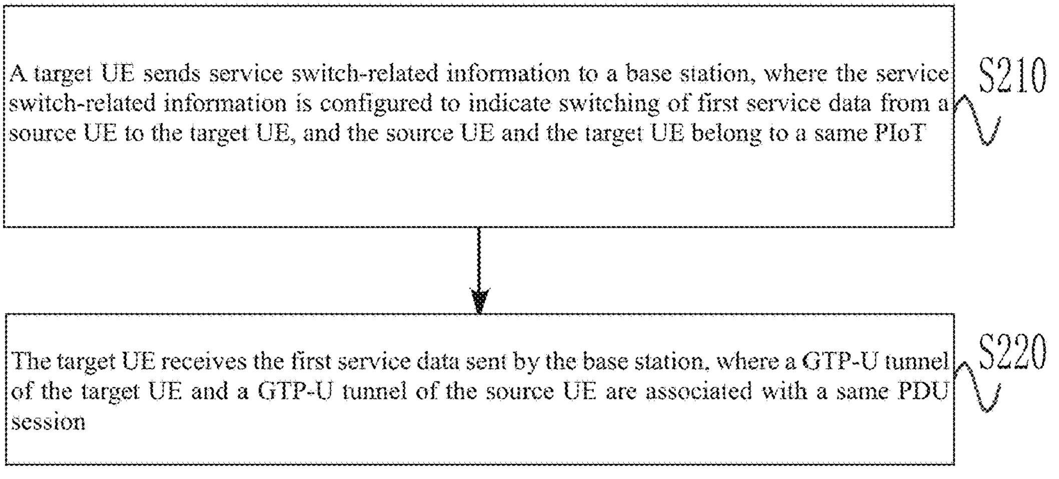
FIG. 2 is a flowchart of a method for service switch between UEs provided by an embodiment of the present disclosure.

FIG. 2 is a flowchart of a method for service switch between UEs provided by an embodiment of the present disclosure. As shown in FIG. 2, the method for service switch between UEs provided by this embodiment includes the following steps.

In a step of S210, a target UE sends service switch-related information to a base station, where the service switch-related information is used to indicate switching of first service data from a source UE to the target UE, and the source UE and the target UE belong to a same PIoT.

The method for service switch between UEs provided in this embodiment is applied to a target UE. To switch a first service originally running in a source UE to the target UE, that is, to switch first service data sent to the source UE to the target UE, the target UE needs to send service switch-related information to the base station first. The target UE sends the service switch-related information to the base station to which the target UE is connected. The service switch-related information is used to indicate switching of the first service data from the source UE to the target UE.

The service switch-related information includes at least one of a service switch indication, a to-be-switched PDU session identifier, or a source UE identifier (UE 1's NAS ID).

To enable the target UE to know related information of the source UE, before the target UE sends the service switch-related information to the base station, the target UE may also receive PIoT subscription information of the PIoT to which the target UE belongs sent by a Home Subscriber Server (HSS) or a Unified Data Management (UDM), and the PIoT subscription information includes a list of identifiers of UEs belonging to a same user. The target UE may acquire the service switch-related information from the PIoT subscription information.

The source UE and the target UE may access the same base station or may access different base stations. If the source UE and the target UE access the same base station, service switching may be performed without the participation of a core network (CN). The service switch from the source UE to the target UE may be triggered by the target UE or may be triggered by the source UE. If the service switch is triggered by the target UE, the target UE directly sends the service switch-related information to the base station. If the service switch is triggered by the source UE, the source UE directly sends the service switch-related information to the base station. If the service switch is triggered by the source UE, the source UE sends service switch indication information to the base station, where the service switch indication information is used to indicate switching of the first service data from the source UE to the target UE. The service switch indication information includes at least one of a service switch indication, a to-be-switched PDU session identifier, or a target UE identifier (UE 2's NAS ID). The base station determines the target UE to which the service is switched according to the service switch indication information, and sends a paging message to the target UE, and the paging message includes the service switch indication information. The target UE may carry the service switch-related information in a paging response message sent to the base station.

If the source UE and the target UE access different base stations, service switching requires the participation of a CN. The service switch from the source UE to the target UE may be triggered by the target UE or the source UE. If the service switch is triggered by the target UE, the target UE sends service switch-related information to a base station, and then the base station sends the service switch-related information to the CN. After completing the service switch from the source UE to the target UE, that is, after associating a GTP-U tunnel of the target UE and a GTP-U tunnel of the source UE with a same PDU session, a CN device sends a response to the base station to which the target UE is connected, such that the base station informs the source UE and the target UE. If the service switch is triggered by the source UE, the source UE sends service switch indication information to the CN through the base station to which the source UE is connected or directly sends the service switch indication information to the CN. The service switch indication information is used to indicate switching of the first service data from the source UE to the target UE. The service switch indication information includes at least one of a service switch indication, a to-be-switched PDU session identifier, or a target UE identifier. The CN device determines the target UE to which the service is switched according to the service switch indication information, and sends a paging message to the target UE through the base station to which the target UE is connected, and the paging message includes the service switch indication information. The target UE may carry the service switch-related information in the paging response message sent to the base station.

In a step of S220, the target UE receives the first service data sent by the base station, where the GTP-U of the target UE and the GTP-U tunnel of the source UE are associated with the same PDU session.

After receiving the service switch-related information sent by the target UE, the base station to which the target UE is connected may determine that the first service data of the source UE needs to be switched to the target UE according to the service switch-related information. Therefore, the base station may send the first service data to the target UE. The GTP-U of the target UE and the GTP-U of the source UE are associated with the same PDU session, and the association of the GTP-U tunnels with the same PDU session is performed by the CN. The base station may send the received service switch-related information to the CN device, such that the CN device associates the GTP-U tunnels with the same PDU session.

Before the target UE receives the first service data sent by the base station, the target UE may also receive a Radio Resource Control (RRC) reconfiguration message sent by the base station, and the RRC reconfiguration message includes a Cell-Radio Network Temporary Identifier (C-RNTI) of the source UE, where both the source UE and the target UE are connected to the base station and receive the same user plane data. That is, when the source UE and the target UE access the same base station, the base station controls the service switch.

If the base station allocates the C-RNTI of the source UE to the target UE, since the C-RNTI of the source UE is the same as that of the target UE, it is necessary to determine how to feed back Radio Link Control (RLC) state information and/or Hybrid Automatic Repeat reQuest (HARQ). The RLC state information and/or HARQ may be fed back in any of the following ways.

1. A primary UE is distinguished from a secondary UE. Only the primary UE feeds back RLC state information and/or HARQ Acknowledgement/Negative Acknowledgement (ACK/NACK). Then, the target UE does not feed back the RLC state information and/or HARQ ACK/NACK before being switched as the primary UE, and feeds back the RLC state information and/or HARQ ACK/NACK to the base station after being switched as the primary UE.
2. Both the source UE and the target UE feed back the RLC state information and/or HARQ ACK/NACK. The base station determines whether to retransmit the service data when receiving the RLC state information and/or HARQ ACK/NACK fed back by either the source UE or the target UE, or the base station determines whether to retransmit the service data when receiving the RLC state information and/or HARQ ACK/NACK fed back by both the source UE and the target UE. The base station retransmits the service data when receiving the RLC state information and/or the HARQ NACK fed back by both the target UE and the source UE, or the base station retransmits the service data when receiving the RLC state information and/or the HARQ NACK fed back by the target UE or the source UE.

3. When the first service data is in an Unacknowledged Mode (UM), the target UE does not feed back the RLC state information and/or HARQ ACK/NACK.

According to the method for service switch between UEs provided by the embodiment, a target UE sends, to a base station, service switch-related information configured to indicate switching of first service data from a source UE to the target UE, and the target UE receives the first service data sent by the base station, where a GTP-U tunnel of the target UE and a GTP-U tunnel of the source UE are associated with a same PDU session, and the source UE and the target UE belong to a same PIoT, achieving smooth switch of a service between UEs belonging to the same user.

Figure 3:
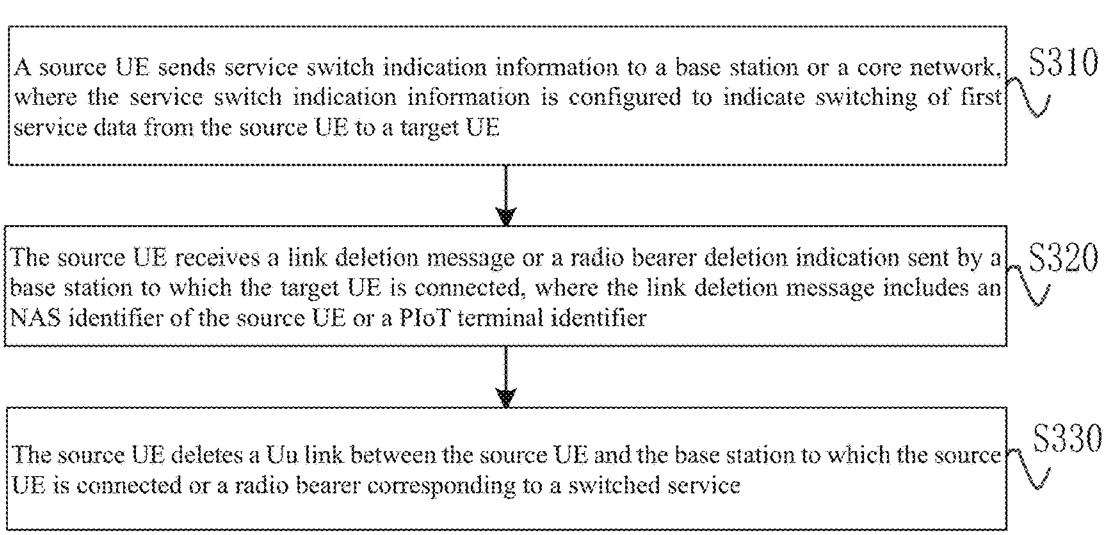
FIG. 3 is a flowchart of another method for service switch between UEs provided by an embodiment of the present disclosure.

FIG. 3 is a flowchart of another method for service switch between UEs provided by an embodiment of the present disclosure. As shown in FIG. 3, the method for service switch between UEs provided by this embodiment includes the following steps.

In a step of S310, a source UE sends service switch indication information to a base station or a CN, where the service switch indication information is used to indicate switching of first service data from the source UE to a target UE.

The method for service switch between UEs provided by this embodiment is applied to a source UE. To switch a first service originally running in the source UE to a target UE, that is, to switch first service data sent to the source UE to the target UE, the source UE needs to send service switch indication information to the base station or the CN first. The source UE sends the service switch indication information to the base station to which the source UE is connected or to the CN directly. The service switch indication information is used to indicate switching of the first service data from the source UE to the target UE. The service switch indication information includes at least one of a service switch indication, a to-be-switched PDU session identifier, or a target UE identifier.

In a step of S320, the source UE receives a link deletion message or a radio bearer deletion indication sent by a base station to which the target UE is connected, where the link deletion message includes a NAS identifier of the source UE or a PIoT terminal identifier.

In a step of S330, the source UE deletes a Uu link between the source UE and the base station to which the source UE is connected or a radio bearer corresponding a switched service.

After the first service data is switched from the source UE to the target UE, the link or radio bearer of the source UE needs to be deleted. After receiving the link deletion message or radio bearer deletion indication sent by the base station to which the target UE is connected, the source UE may delete the Uu link between the source UE and the base station to which the source UE is connected or the radio bearer corresponding to the switched service. The source UE and the target UE may be connected to the same base station, or the source UE and the target UE may be connected to different base stations.

The Uu link of the source UE or the radio bearer corresponding to the switched service may be decided to be deleted by the base station, or may be decided to deleted after the source UE reports a release indication, or may be released actively after the base station senses that the synchronization with the target UE is completed. After allocating a C-RNTI of the source UE to the target UE, it is also necessary to determine how the source UE reports the release indication.

The source UE may report a release request to the CN, which carries an NAS identifier of the source UE and/or a switched PDU session identifier. The CN sends a UE context modification request to the base station, which carries an NAS identifier of the source UE and a PIoT context release indication. Alternatively, the source UE may report a release request to the base station, which carries an NAS identifier of the source UE and/or a switched PDU session identifier, where the release request is an RRC message or a Media Access Control Control Element (MAC CE). The base station sends the RRC message or MAC CE carrying the NAS identifier of the source UE or the PIoT terminal identifier to the source UE to trigger the source UE to delete the Uu link or the radio bearer.

FIG. 4 is a flowchart of another method for service switch between UEs provided by an embodiment of the present disclosure. As shown in FIG. 4, the method for service switch between UEs provided by this embodiment includes the following steps.

In a step of S410, a base station receives service switch-related information sent by a target UE, where the service switch-related information is used to indicate switching of first service data from a source UE to the target UE, and the source UE and the target UE belong to a same PIoT.

The method for service switch between UEs provided by this embodiment is applied to a base station, to be specific, a base station to which the target UE is connected. After receiving the service switch-related information sent by the target UE, the base station determines that service switch is needed. The service switch-related information is used to indicate switching of first service data from the source UE to the target UE.

The service switch-related information includes at least one of a service switch indication, a to-be-switched PDU session identifier, or a source UE identifier.

After receiving the service switch-related information sent by the target UE, the base station sends the service switch-related information to a CN, such that the CN associates a GTP-U tunnel of the target UE and a GTP-U tunnel of the source UE to a same PDU session.

If the service switch from the source UE to the target UE is triggered by the source UE, the base station receives service switch indication information sent by the source UE, where the service switch indication information is used to indicate switching of first service data from the source UE to the target UE. Then, the base station sends a paging message to the target UE, and the paging message includes service switch indication information. The base station receives a paging response message sent by the target UE, and the paging response message includes the service switch-related information. The service switch indication information includes at least one of a service switch indication, a to-be-switched PDU session identifier, or a target UE identifier.

In a step of S420, the base station sends the first service data to the target UE, where the GTP-U tunnel of the target UE and the GTP-U tunnel of the source UE are associated with the same PDU session.

After receiving the service switch-related information sent by the target UE, the base station to which the target UE is connected may determine that the first service data of the source UE needs to be switched to the target UE according to the service switch-related information. Therefore, the base station may send the first service data to the target UE. The GTP-U tunnel of the target UE and the GTP-U tunnel of the source UE are associated with the same PDU session, and the association of the GTP-U tunnels with the same PDU session is performed by the CN. The base station may send the received service switch-related information to a CN device, such that the CN device associates the GTP-U tunnels with the same PDU session.

Before the target UE receives the first service data sent by the base station, the base station may also send an RRC reconfiguration message to the target UE, and the RRC reconfiguration message includes a C-RNTI of the source UE, where both the source UE and the target UE are connected to the base station. That is, when the source UE and the target UE access the same base station, the base station controls the service switch.

The base station may send the RRC reconfiguration message to the target UE when determining that Uu links of the target UE and the source UE exist at the same time and that the target UE and the source UE belong to the same PIoT. Alternatively, when determining that the Uu links of the target UE and the source UE exist at the same time after sending the RRC reconfiguration message to the target UE, the base station determines that the target UE and the source UE belong to the same PIoT.

In addition, after sending the first service data to the target UE, the base station may delete the link established with the source UE. To be specific, the base station may delete the link established with the source UE after receiving the link sent by the source UE or a radio bearer release indication corresponding to a first service, or the base station deletes the link established with the source UE or the radio bearer corresponding to the first service when determining that the first service data is switched to the target UE.

After the base station receives a link release indication sent by the source UE, the base station deletes the link established with the source UE, which includes that: after the base station receives a UE context modification request and a PIoT context release indication sent by the CN, the base station sends a link deletion message to the source UE, where the link deletion message is configured to indicate the source UE to delete the Uu link between the source UE and the base station, the UE context modification request and PIoT context release indication are triggered after the CN receives a link release request carrying an NAS identifier of the source UE sent by the source UE, the UE context modification request incudes the NAS identifier of the source UE, the link deletion message is an RRC message or an MAC CE, and the link deletion message includes the NAS identifier of the source UE or a PIoT terminal identifier; or, after the base station receives the link release request carrying the NAS identifier of the source UE sent by the source UE, the base station sends a link deletion message to the source UE, where the link deletion message is configured to indicate the source UE to delete the Uu link between the source UE and the base station, the link release request is an RRC message or MAC CE, and the link deletion message includes the NAS identifier of the source UE or the PIoT terminal identifier.

Alternatively, when the source UE carries multiple services and only a first service is switched, only a radio bearer corresponding to the first service may be released. After the base station receives the radio bearer release indication corresponding to the first service sent by the source UE, the base station deletes the radio bearer corresponding to the first service established with the source UE, which includes that: after the base station receives a UE context modification request and a PIoT context release indication sent by the CN, the base station sends a bearer release indication to the source UE, where the bearer release indication is configured to indicate the source UE to delete the radio bearer corresponding to the first service established with the base station, and the UE context modification request and the PIoT context release indication are triggered after the CN receives the service release request carrying the NAS identifier of the source UE sent by the source UE, the UE context modification request includes the NAS identifier of the source UE and/or the switched PDU session identifier, the bearer release indication is an RRC message or MAC CE, and the radio bearer deletion message corresponding to the first service includes the radio bearer identifier corresponding to the first service; or, after the base station receives the link release request carrying the NAS identifier of the source UE sent by the source UE, the base station sends a bearer release indication to the source UE, where the bearer release indication is configured to indicate the source UE to delete the radio bearer corresponding to the first service established with the base station, the bearer release indication is an RRC message or MAC CE, and the radio bearer deletion message corresponding to the first service includes the radio bearer identifier corresponding to the first service.

FIG. 5 is a flowchart of another method for service switch between UEs provided by an embodiment of the present disclosure. As shown in FIG. 5, the method for service switch between UEs provided by this embodiment includes the following steps.

In a step of S510, a CN device receives service switch-related information, where the service switch-related information is used to indicate switching of first service data from a source UE to a target UE.

The method for service switch between UEs provided by this embodiment is applied to a CN device, where the CN device may be any one or more CN devices performing corresponding functions. The CN device may receive service switch-related information forwarded by a base station to which the target UE is connected, or the CN device may receive service switch indication information directly sent by the source UE. The service switch-related information is used to indicate switching of the first service data from the source UE to the target UE, and the service switch indication information is used to indicate switching of the first service data from the source UE to the target UE.

In a step of S520, when determining that the source UE and the target UE belong to a same PIoT, the CN device associates a GTP-U tunnel of the target UE and a GTP-U tunnel of the source UE with a same PDU session.

When determining that a service of the source UE needs to be switched to the target UE according to the service switch-related information, the CN device first determines that the source UE and the target UE belong to the same PIoT, and then associates the GTP-U tunnel of the target UE and the GTP-U tunnel of the source UE with the same PDU session, such that the first service data sent to the source UE can be switched to the target UE.

In an embodiment, an Access and Mobility Management Function (AMF) receives the service switch-related information. When determining that the source UE and the target UE belong to the same PIoT, the AMF associates the GTP-U tunnel of the target UE and the GTP-U tunnel of the source UE with the same PDU session.

The AMF may receive the service switch-related information sent by the base station to which the target UE is connected. Alternatively, the AMF may receive the service switch indication information sent by the base station to which the source UE is connected, or the AMF may receive the service switch indication information directly sent by the source UE.

If the AMF receives the service switch indication information sent by the source UE, the AMF sends a paging message to the base station to which the target UE is connected, where the paging message is configured to enable the base station to which the target UE is connected to send the paging information to the target UE, and the paging message includes the service switch indication information.

When the service switch is triggered by the target UE, the HSS or UDM sends PIoT subscription information of the PIoT to which the target UE belongs to the target UE, and the PIoT subscription information includes a list of identifiers of UEs belonging to a same user. When the service switch is triggered by the source UE, the HSS or UDM sends PIoT subscription information of the PIoT to which the source UE belongs to the source UE and/or AMF.

If the target UE and the source UE access different base stations, the service switch needs to be performed by the CN device. When determining that the source UE and the target UE belong to the same PIoT, the AMF sends a session management update request to a Session Management Function (SMF), and the session management update request includes related information of the PDU session related to the source UE. The SMF sends a session establishment request to a User Plane Function (UPF), and the session establishment request includes CN channel information of the source UE. The UPF sends a session establishment response to the SMF, and the session establishment response includes related information of the PDU session related to the source UE. The SMF sends a session management update response to the AFM, and the session management update response includes related information of the PDU session related to the source UE. In this way, the service switch is completed at the CN side.

When the CN device performs service switch, a data stream of the User Plane (UP) is duplicated in the UPF, after the UPF duplicates the first service data of the source UE, the duplicated first service data is sent to the target UE through the base station to which the target UE is connected.

The method for service switch between UEs provided by the present disclosure will be further illustrated below in detail by way of several embodiments. In FIGS. 6-10, UE 1 is a source UE, UE 2 is a target UE, a gNB is a base station to which both the source UE and the target UE are connected, a second gNB is a base station to which the target UE is connected, and a first gNB is a base station to which the source UE is connected. An Authentication Server Function is configured to perform authentication on the UEs.

Figure 6:
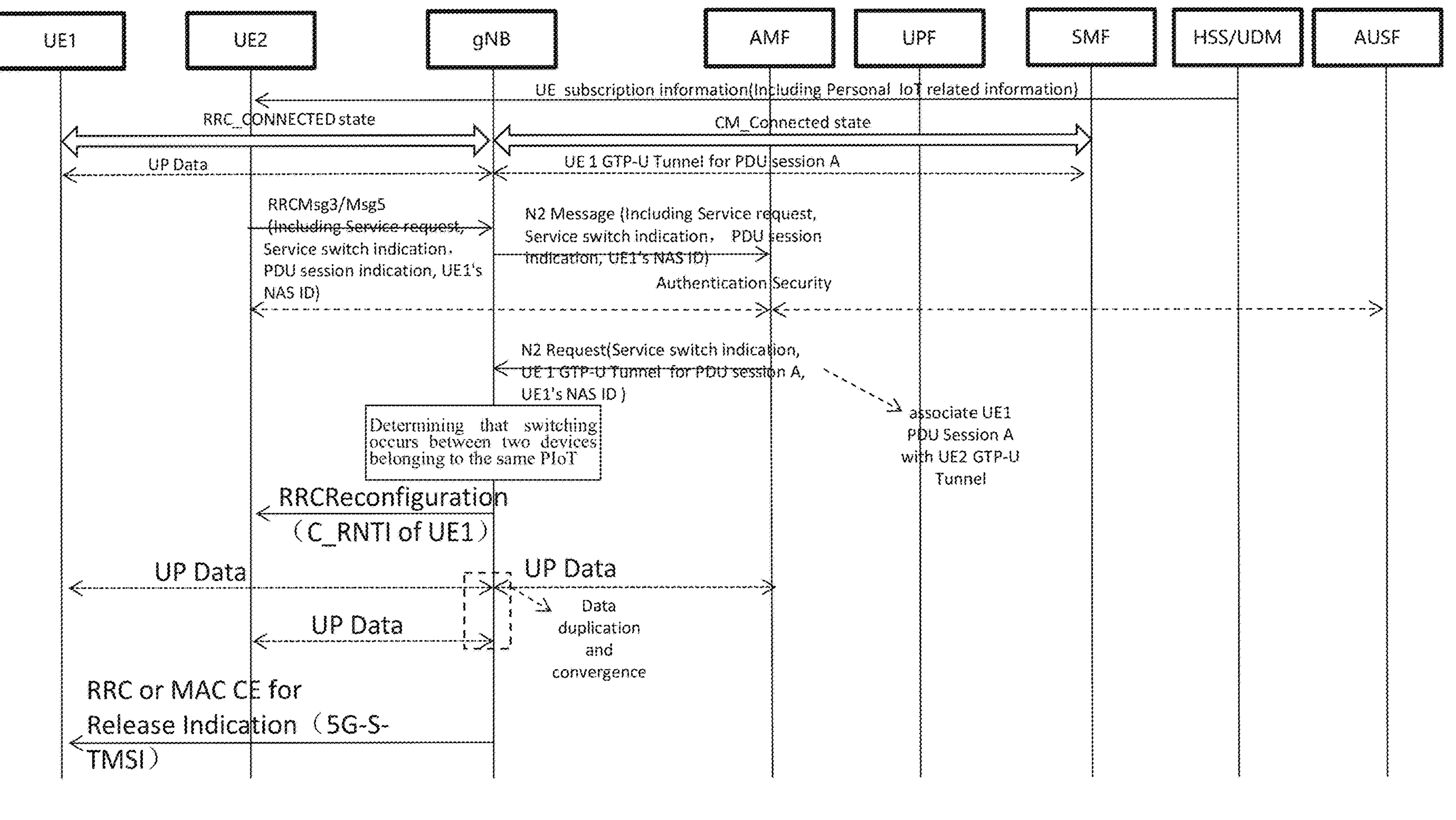
FIG. 6 is a first interaction flowchart of a method for service switch between UEs provided by an embodiment of the present disclosure.

FIG. 6 is a first interaction flowchart of a method for service switch between UEs provided by an embodiment of the present disclosure. To be specific, FIG. 6 is a UPF continuous switch interaction flowchart of service switch from a source UE to a target UE under the same base station triggered by the target UE.

In FIG. 6, the HSS/UDM sends PIoT subscription information (UE subscription information (including Personal IoT related information) to the UE 2. The gNB maintains an RRC connected state (RRC_CONNECTED_state) (CM_CONNECTED_state) with the UE 1 and the SMF. The SMF establishes a GTP-U tunnel for PDU session A for the UE 1, and then the gNB can send service data (UP Data) to the UE 1. The UE 2 triggers a service switch to the gNB through an RRC Msg3/Msg5 (including Service request, Service switch indication, PDU session indication, UE 1's NAS ID). The gNB sends an N2 message (including Service request, Service switch indication, PDU session indication, UE 1's NAS ID) to the AMF. The AMF performs authentication (Authentication Security) on the UE 2 through the AUSF. The AMF sends an N2 request (including Service switch indication, UE 1 GTP-U Tunnel for PDU session A, UE 1's NAS ID) to the gNB, and the AMF also associates the GTP-U tunnel of the target UE and the GTP-U tunnel of the source UE to the same PDU session (associate UE 1 PDU Session A with UE 2 GTP-U Tunnel). When determining that the UE 1 and UE 2 to be switched belong to the same PIoT, the gNB sends an RRC reconfiguration message (RRC Reconfiguration) to the UE 2, including a C-RNTI of UE 1 (C_RNTI of UE 1). The gNB migrates the service data of the UE 1 to the UE 2 (data duplication and convergence). Finally, the gNB indicates the UE 1 to release a link (RRC or MAC CE for Release Indication (5G-S-TMSI)).

Figure 7:
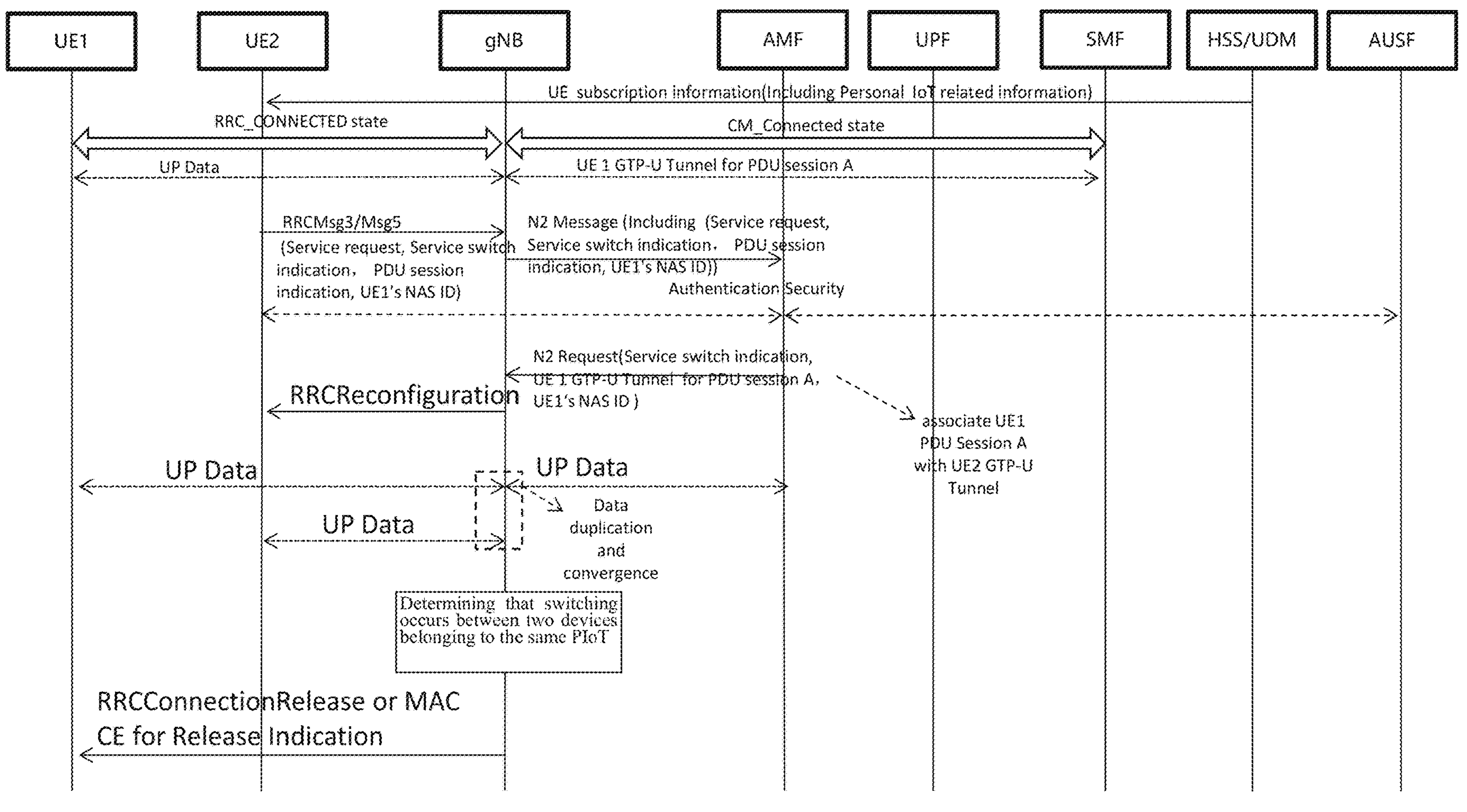
FIG. 7 is a second interaction flowchart of a method for service switch between UEs provided by an embodiment of the present disclosure.

FIG. 7 is a second interaction flowchart of a method for service switch between UEs provided by an embodiment of the present disclosure. To be specific, FIG. 7 is a control plane continuous switch interaction flowchart of service switch from a source UE to the target UE under the same base station triggered by the target UE.

In FIG. 7, the HSS/UDM sends PIoT subscription information (UE subscription information (including Personal IoT related information) to the UE 2. The gNB maintains an RRC connected state (RRC_CONNECTED_state) (CM_CONNECTED_state) with the UE 1 and the SMF. The SMF establishes a GTP-U tunnel for PDU session A for the UE 1, and then the gNB sends service data (UP Data) to the UE 1. The UE 2 triggers a service switch to the gNB through an RRC Msg3/Msg5 (including Service request, Service switch indication, PDU session indication, UE 1's NAS ID). The gNB sends an N2 message (including Service request, Service switch indication, PDU session indication, UE 1's NAS ID) to the AMF. The AMF performs authentication (Authentication Security) on the UE 2 through the AUSF. The AMF sends an N2 request (including Service switch indication, UE 1 GTP-U Tunnel for PDU session A, UE 1's NAS ID) to the gNB, and the AMF also associates the GTP-U tunnel of the target UE and the GTP-U tunnel of the source UE to the same PDU session (associate UE 1 PDU Session A with UE 2 GTP-U Tunnel). The gNB sends an RRC reconfiguration message (RRC Reconfiguration) to the UE 2, and the gNB migrates the service data of the UE 1 to the UE 2 (data duplication and convergence). When determining that the UE 1 and the UE 2 to be switched belong to the same PIoT, the gNB indicates the UE 1 to release a link (RRC ConnectionRelease or MAC CE for Release Indication). When link establishment with the UE 2 is completed, and the gNB determines that the two UEs belong to the same PIoT, the gNB transfers a data cache of the UE 1 to the UE 2 (NG interfaces may share one link and follow the modify process), and meanwhile sends an RRCConnectionRelease message to the UE 1.

Figure 8:
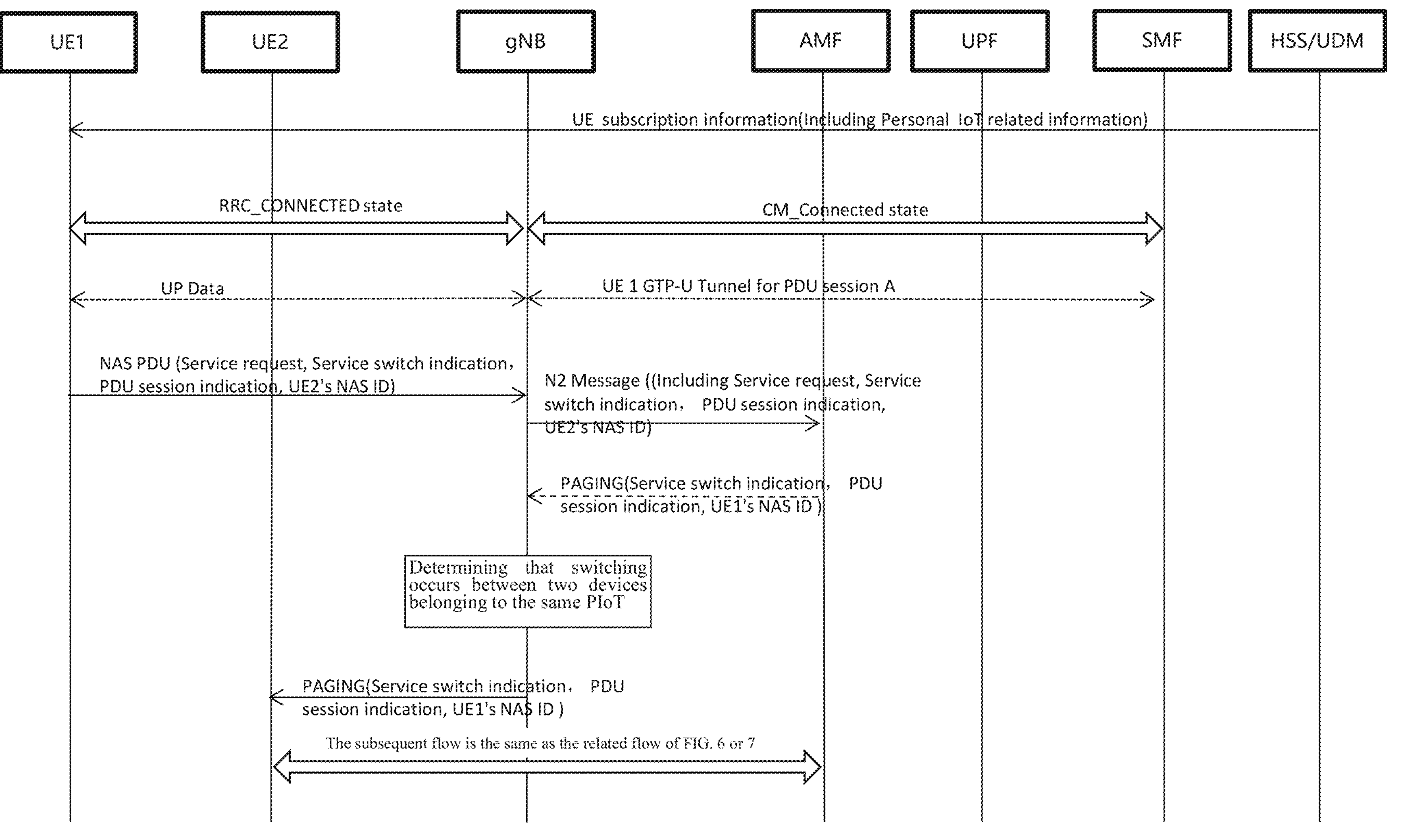
FIG. 8 is a third interaction flowchart of a method for service switch between UEs provided by an embodiment of the present disclosure.

FIG. 8 is a third interaction flowchart of a method for service switch between UEs provided by an embodiment of the present disclosure. To be specific, FIG. 8 is a continuous switch interaction flowchart of service switch from a source UE to a target UE under the same base station triggered by the source UE.

In FIG. 8, the HSS/UDM sends PIoT subscription information (UE subscription information (including Personal IoT related information) to the UE 1. The gNB maintains an RRC connected state (RRC_CONNECTED_state) (CM_CONNECTED_state) with the UE 1 and the SMF. The SMF establishes a GTP-U tunnel for PDU session A for the UE 1, and then the gNB can send service data (UP Data) to the UE 1. The UE 1 triggers a service switch to the gNB through an NAS PDU (including Service request, Service switch indication, PDU session indication, UE 2's NAS ID). The gNB sends an N2 message (including Service request, Service switch indication, PDU session indication, UE 2's NAS ID) to the AMF. The AMF sends a paging message (PAGING (including Service switch indication, PDU session indication, UE 1's NAS ID) to the gNB. When the gNB determines that UE 1 and UE 2 to be switched belong to the same PIoT, the gNB sends a paging message (PAGING (including Service switch indication, PDU session indication, UE 1's NAS ID) to the UE 2. The subsequent flow of FIG. 8 is the same as the subsequent service switch flows of FIGS. 6 and 7, which will not be repeated here.

Figure 9:
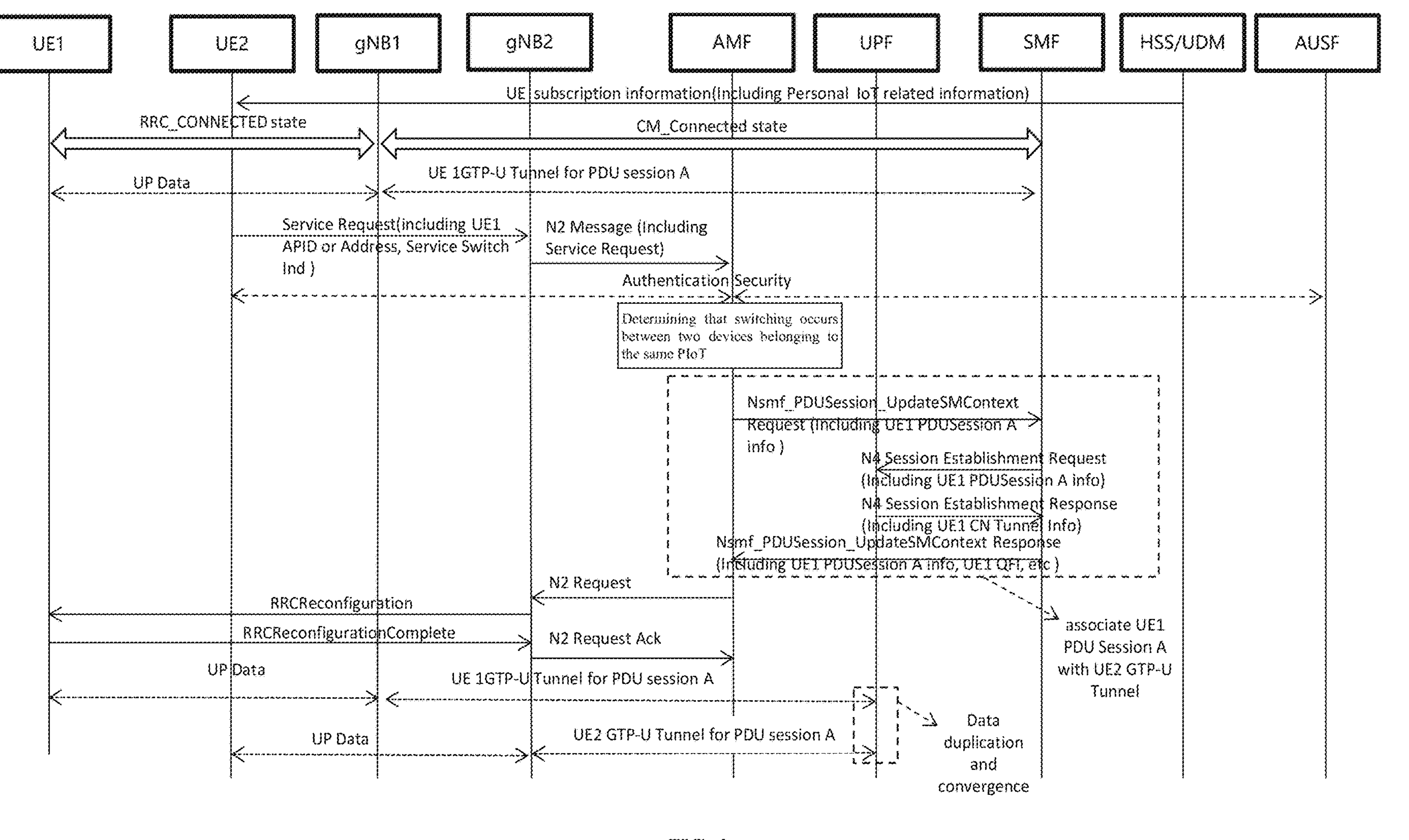
FIG. 9 is a fourth interaction flowchart of a method for service switch between UEs provided by an embodiment of the present disclosure.

FIG. 9 is a fourth interaction flowchart of a method for service switch between UEs provided by an embodiment of the present disclosure. To be specific, FIG. 9 is a continuous switch interaction flowchart of service switch from a source UE to a target UE based on CN sensing and triggered by the target UE.

In FIG. 9, the HSS/UDM sends PIoT subscription information (UE subscription information (including Personal IoT related information) to the UE 2. The gNB 1 maintains an RRC connected state (RRC_CONNECTED_state) (CM_CONNECTED_state) with the UE 1 and the SMF. The SMF establishes a GTP-U tunnel for PDU session A for the UE 1, and then the gNB 1 can send service data (UP Data) to the UE 1. The UE 2 triggers a service switch (Service Request (including UE 1 APID or Address, Service Switch Ind) to the gNB 2, and the gNB 2 sends an N2 message (including Service Request) to the AMF. The AMF performs authentication (Authentication Security) on the UE 2 through the AUSF. When the AMF determines that the UE 1 and the UE 2 to be switched belong to the same PIoT, the AMF sends, to the SMF, a session management update request (Nsmf_PDU SessionUpdateSMContext Request), which carries related information of UE 1 PDU Session A, such as PDU Session ID of PDU Session A, CN Tunnel Info, etc. The SMF sends, to the UPF, an N4 session establishment request, which carries UE 1 CN Tunnel Info. The UPF sends, to the SMF, an N4 session establishment response, which carries related information of UE 1 PDU Session A, such as PDU Session ID of PDU Session A, CN Tunnel Info, etc. The SMF sends, to the AMF, a session management update response (Nsmf_PDUSessionUpdateSMContext Response), which includes PDU Session ID of PDU Session A, CN Tunnel Info, QFI(s), QoS profile(s), CN N3 Tunnel Info, S-NSSAI, User Plane Security Enforcement, UE Integrity Protection Maximum Data Rate, RSN, etc. A data stream of the user plane is duplicated in the UPF and transmitted on links of the two UEs respectively (association between CN session/tunnel IDs before switching and after switching). The AMF sends an N2 request to the gNB 2, the gNB 2 sends an RRC reconfiguration message (RRCReconfiguration) to the UE 1, the UE 1 sends an RRC reconfiguration complete message (RRCReconfigurationComplete) to the gNB 2, and then the gNB 2 sends an N2 request acknowledgement (N2 Request Ack) to the AMF. The UPF migrates the service data of the UE 1 to the UE 2 (Data duplication and convergence). When receiving and sending data, the UPF sends data simultaneously on the GTP-U tunnel of the UE 1 and the GTP-U tunnel of the UE 2, or receives/merges data simultaneously on the GTP-U tunnel of the UE 1 and the GTP-U tunnel of the UE 2.

Figure 10:
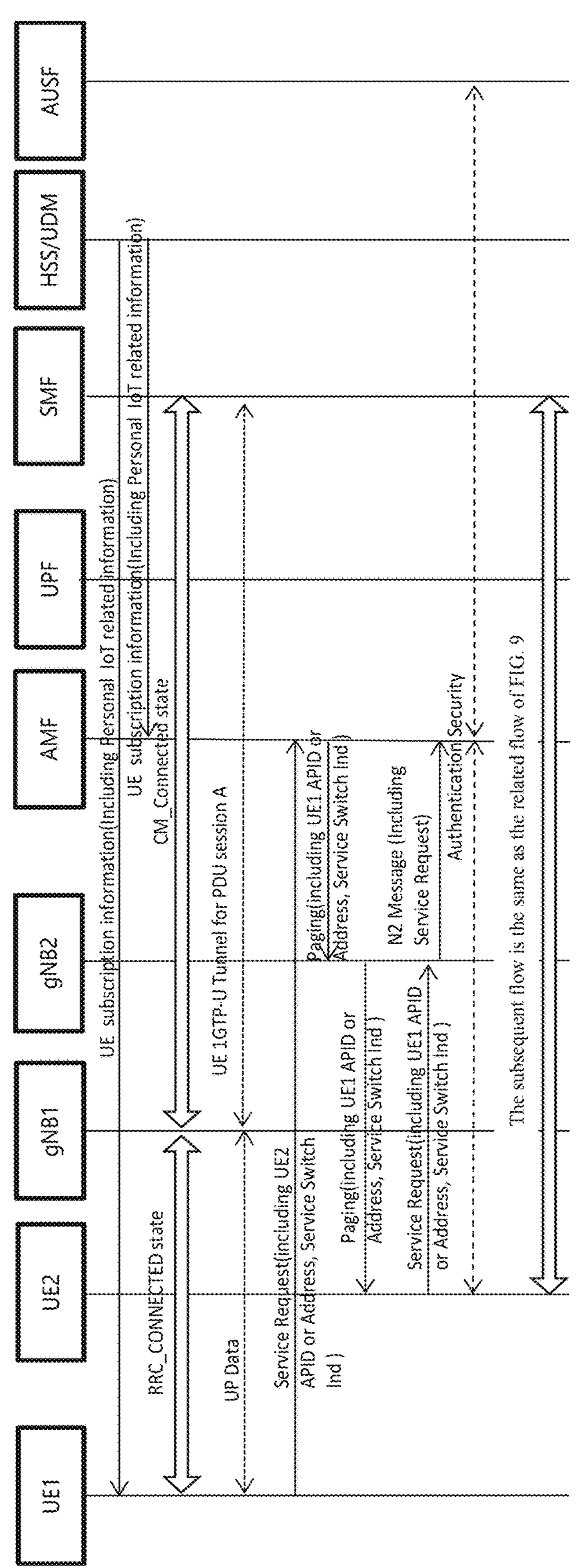
FIG. 10 is a fifth interaction flowchart of a method for service switch between UEs provided by an embodiment of the present disclosure.

FIG. 10 is a fifth interaction flowchart of a method for service switch between UEs provided by an embodiment of the present disclosure. To be specific, FIG. 10 is a UPF continuous switch interaction flowchart of service switch from a source UE to a target UE based on CN sensing and triggered by the source UE.

In FIG. 10, the HSS/UDM sends PIoT subscription information (UE subscription information (including Personal IoT related information) to the UE 1 and the AMF. The UE 1 and/or AMF store the subscription information. The gNB 1 maintains an RRC connected state (RRC_CONNECTED_state) (CM_CONNECTED_state) with the UE 1 and the SMF, and carries a PDU Session A. The SMF establishes a GTP-U tunnel for PDU session A for the UE 1, and then the gNB 1 can send service data (UP Data) to the UE 1. The UE 1 triggers a service switch (Service Request, including UE 2 APID or Address, Service Switch Ind) to the AMF, the AMF sends a paging message (Paging (including UE 1 APID or Address, Service Switch Ind) to the gNB 2, and the gNB 2 sends the paging message (Paging (including UE 1 APID or Address, Service Switch Ind) to the UE 2. The UE 2 then sends a service request (including UE 1 APID or Address, Service Switch Ind) to the gNB 2, and the gNB 2 sends an N2 message (including Service Request) to the AMF. The AMF performs authentication (Authentication Security) on the UE 2 through the AUSF. The subsequent flow of FIG. 10 is the same as the subsequent service switch flow of FIG. 9, which will not be repeated here.

An embodiment of the present disclosure further provides a UE which is a target UE, including:

a sending module configured to send service switch-related information to a base station, where the service switch-related information is used to indicate switching of first service data from a source UE to the target UE, and the source UE and the target UE belong to a same PIoT; and a receiving module configured to receive the first service data sent by the base station, where a GTP-U tunnel of the target UE and a GTP-U tunnel of the source UE are associated with a same PDU session. The UE provided by this embodiment is configured to implement the method for service switch between UEs of the embodiment as shown in FIG. 2.

An embodiment of the present disclosure provides a UE which is a source UE, including:

a sending module configured to send service switch indication information to a base station or a CN, where the service switch indication information is used to indicate switching of first service data from the source UE to a target UE; a receiving module configured to receive a link deletion message sent by a base station to which the target UE is connected, where the link deletion message includes an NAS identifier of the source UE or a PIoT terminal identifier; and a connection module configured to delete a Uu link between the source UE and the base station to which the source UE is connected. The UE provided by this embodiment is configured to implement the method for service switch between UEs of the embodiment as shown in FIG. 3.

An embodiment of the present disclosure provides a base station, including:

a receiving module configured to receive service switch-related information sent by a target UE, where the service switch-related information is used to indicate switching of first service data from a source UE to the target UE, and the source UE and the target UE belong to a same PIoT; and a sending module configured to send the first service data from the base station to the target UE, where a GTP-U tunnel of the target UE and a GTP-U tunnel of the source UE are associated with a same PDU session. The UE provided by this embodiment is configured to implement the method for service switch between UEs of the embodiment as shown in FIG. 4.

An embodiment of the present disclosure provides a CN device, including:

a receiving module configured to receive service switch-related information, where the service switch-related information is used to indicate switching of first service data from a source UE to a target UE; and a processing module configured to associate a GTP-U tunnel of the target UE and a GTP-U tunnel of the source UE with a same PDU session when determining that the source UE and the target UE belong to a same PIoT. The UE provided by this embodiment is configured to implement the method for service switch between UEs of the embodiment as shown in FIG. 5.

An embodiment of the present disclosure provides a storage medium, containing a computer-executable instruction which, when executed by a computer processor, causes the computer processor to implement a method for service switch between UEs. The method includes: sending, by a target UE, service switch-related information to a base station, where the service switch-related information is used to indicate switching of first service data from a source UE to the target UE, and the source UE and the target UE belong to a same PIoT; and receiving, by the target UE, the first service data sent by the base station, where a GTP-U tunnel of the target UE and a GTP-U tunnel of the source UE are associated with a same PDU session.

An embodiment of the present disclosure provides a storage medium, containing a computer-executable instruction which, when executed by a computer processor, causes the computer processor to implement a method for service switch between UEs. The method includes: sending, by a source UE, service switch indication information to a base station or a CN, where the service switch indication information is used to indicate switching of first service data from the source UE to a target UE; receiving, by the source UE, a link deletion message or a radio bearer deletion indication sent by a base station to which the target UE is connected, where the link deletion message includes an NAS identifier of the source UE or a PIoT terminal identifier; and deleting, by the source UE, a Uu link between the source UE and the base station to which the source UE is connected or a radio bearer corresponding a switched service.

An embodiment of the present disclosure further provides a storage medium, containing a computer-executable instruction which, when executed by a computer processor, causes the computer processor to implement a method for service switch between UEs. The method includes: receiving, by a base station, service switch-related information sent by a target UE, where the service switch-related information is used to indicate switching of first service data from a source UE to the target UE, and the source UE and the target UE belong to a same PIoT; and sending, by the base station, the first service data to the target UE, where a GTP-U tunnel of the target UE and a GTP-U tunnel of the source UE are associated with a same PDU session.

An embodiment of the present disclosure further provides a storage medium, containing a computer-executable instruction which, when executed by a computer processor, causes the computer processor to implement a method for service switch between UEs. The method includes: receiving, by a CN device, service switch-related information, where the service switch-related information is used to indicate switching of first service data from a source UE to a target UE; and when determining that the source UE and the target UE belong to a same PIoT, associating, by the CN device, a GTP-U tunnel of the target UE and a GTP-U tunnel of the source UE with a same PDU session.

In general, various embodiments of the present disclosure may be implemented in hardware or special-purpose circuit, software, logic, or any combination thereof. For example, various embodiments of the present disclosure may be implemented in hardware in some aspects, while implemented in firmware or software that may be executed by a controller, microprocessor or other computing devices in other aspects, and the present disclosure is not limited thereto.

Embodiments of the present disclosure may be implemented by executing a computer program instruction by a data processor of a mobile device, for example in a processor entity, or by hardware, or by a combination of software and hardware. The computer program instruction may be an assembly instruction, an Instruction Set Architecture (ISA) instruction, a machine instruction, a machine-related instruction, a microcode, a firmware instruction, state setting data, or a source code or object code written in any combination of one or more programming languages.

The block diagrams of any logic flow in the drawings of the present disclosure may represent program steps, or may represent interconnected logic circuits, modules and functions, or may represent the combinations of program steps and logic circuits, modules and functions. The computer program may be stored in a memory. The memory may be of any type suitable for the local technical environment and may be implemented using any suitable data storage technology, such as but not limited to, a Read-Only Memory (ROM), a Random Access Memory (RAM), an optical memory device and system (e.g., a Digital Video Disc (DVD) or a Compact Disc (CD)), etc. The computer-readable medium may include a non-transitory storage medium. The data processor may be of any type suitable for the local technical environment, such as but not limited to, a general-purpose computer, a special-purpose computer, a microprocessor, a Digital Signal Processor (DSP), an Application Specific Integrated Circuit (ASIC), a Field-Programmable Gate Array (FPGA) and a processor based on a multi-core processor architecture.

What is claimed is:

1. A method for service switch between User Equipments (UEs), comprising:

sending, by a target UE, service switch-related information to a base station, wherein the service switch-related information is used to indicate switching of first service data from a source UE to the target UE, and the source UE and the target UE belong to a same Personal Internet of Things (PIoT); and receiving, by the target UE, the first service data sent by the base station, wherein a GPRS Tunneling Protocol-User Plane (GTP-U) tunnel of the target UE and a GTP-U tunnel of the source UE are associated with a same Protocol Data Unit (PDU) session.

2. The method of claim 1, wherein the service switch-related information comprises at least one of a service switch indication, a to-be-switched PDU session identifier, or a source UE identifier.

3. The method of claim 1, wherein before sending, by a target UE, service switch-related information to a base station, the method further comprises:

receiving, by the target UE, a paging message sent by the base station, wherein the paging message comprises service switch indication information, the paging message is sent after the base station receives the service switch indication information sent by the source UE, and the service switch indication information is used to indicate switching of the first service data from the source UE to the target UE.

4. The method of claim 3, wherein the service switch indication information comprises at least one of a service switch indication, a to-be-switched PDU session identifier, or a target UE identifier.

5. The method of claim 1, wherein before receiving, by the target UE, the first service data sent by the base station, the method further comprises:

receiving, by the target UE, a Radio Resource Control (RRC) reconfiguration message sent by the base station, wherein the RRC reconfiguration message comprises a Cell-Radio Network Temporary Identifier (C-RNTI) of the source UE, and both the source UE and the target UE are connected to the base station;

wherein after receiving, by the target UE, the RRC reconfiguration message sent by the base station, the method further comprises;

not feeding back, by the target UE, Radio Link Control (RLC) state information and/or Hybrid Automatic Repeat reQuest (HARQ) Acknowledgment (ACK)/Negative Acknowledgement (NACK) before the target UE is switched as a primary UE, and feeding back, by the target UE, the RLC state information and/or the HARQ ACK/NACK to the base station after the target UE is switched as a primary UE; or feeding back, by the target UE, the RLC state information and/or HARQ ACK/NACK, wherein the base station receiving the RLC state information and/or HARQ NACK fed back by both the target UE and the source UE retransmits service data, or the base station receiving the RLC state information and/or HARQ NACK fed back by the target UE or the source UE retransmits service data; or in response to the first service data being in an unacknowledged mode (UM), not feeding back, by the target UE, the RLC state information and/or HARQ ACK/NACK;

wherein before sending, by a target UE, service switch-related information to a base station, the method further comprises:

receiving, by the target UE, PIoT subscription information of the PIOT to which the target UE belongs sent by a Home Subscriber Server (HSS) or a Unified Data Management (UDM), wherein the PIOT subscription information comprises a list of identifiers of UEs belonging to a same user.

6. The method of claim 1, wherein before sending, by a target UE, service switch-related information to a base station, the method further comprises:

receiving, by the target UE, PIOT subscription information of the PIOT to which the target UE belongs sent by a Home Subscriber Server (HSS) or a Unified Data Management (UDM), wherein the PIOT subscription information comprises a list of identifiers of UEs belonging to a same user.

7. A method for service switch between User Equipments (UEs), comprising:

receiving, by a base station, service switch-related information sent by a target UE, wherein the service switch-related information is used to indicate switching of first service data from a source UE to the target UE, and the source UE and the target UE belong to a same Personal Internet of Things (PIoT); and sending, by the base station, the first service data to the target UE, wherein a GPRS Tunneling Protocol-User Plane (GTP-U) tunnel of the target UE and a GTP-U tunnel of the source UE are associated with a same Protocol Data Unit (PDU) session.

8. The method of claim 7, wherein the service switch-related information comprises at least one of a service switch indication, a to-be-switched PDU session identifier, or a source UE identifier.

9. The method of claim 7, wherein after receiving, by a base station, service switch-related information sent by a target UE, the method further comprises:

sending, by the base station, the service switch-related information to a core network (CN), such that the CN associates the GTP-U tunnel of the target UE and the GTP-U tunnel of the source UE with the same PDU session.

10. The method of claim 7, wherein before receiving, by a base station, service switch-related information sent by a target UE, the method further comprises:

receiving, by the base station, service switch indication information sent by the source UE, wherein the service switch indication information is used to indicate switching of the first service data from the source UE to the target UE;

sending, by the base station, a paging message to the target UE, wherein the paging message comprises the service switch indication information;

wherein receiving, by a base station, service switch-related information sent by a target UE comprises:

receiving, by the base station, a paging response message sent by the target UE, wherein the paging response message comprises the service switch-related information.

11. The method of claim 10, wherein the service switch indication information comprises at least one of a service switch indication, a to-be-switched PDU session identifier, or a target UE identifier.

12. The method of claim 7, wherein before sending, by the base station, the first service data to the target UE, the method further comprises:

sending, by the base station, a Radio Resource Control (RRC) reconfiguration message to the target UE, wherein the RRC reconfiguration message comprises a Cell-Radio Network Temporary Identifier (C-RNTI) of the source UE, and both the source UE and the target UE are connected to the base station.

13. The method of claim 12, wherein sending, by the base station, an RRC reconfiguration message to the target UE comprises:

in response to the base station determining that Uu links of the target UE and the source UE exist at the same time, determining that the target UE and the source UE belong to the same PIOT, and sending an RRC reconfiguration message to the target UE; or in response to the base station determining that the Uu links of the target UE and the source UE exist at the same time after sending the RRC reconfiguration message to the target UE, determining that the target UE and the source UE belong to the same PIoT.

14. The method of claim 7, wherein after sending, by the base station, the first service data to the target UE, the method further comprises:

deleting, by the base station, a link established with the source UE.

15. The method of claim 14, wherein deleting, by the base station, a link established with the source UE comprises:

after the base station receives a link sent by the source UE or a radio bearer release indication corresponding to a first service, deleting the link established with the source UE or the radio bearer corresponding to the first service; or after the base station determines that the first service data is switched to the target UE, deleting the link established with the source UE or the radio bearer corresponding to the first service.

16. The method of claim 15, wherein after the base station receives a link sent by the source UE or a radio bearer release indication corresponding to a first service, deleting the link established with the source UE or the radio bearer corresponding to the first service comprises:

after receiving a UE context modification request and a PIOT context release indication sent by the CN, sending, by the base station, a link deletion message to the source UE, wherein the link deletion message is configured to indicate the source UE to delete the Uu link established with the base station or the radio bearer, the UE context modification request and the PIOT context release indication are triggered after the CN receives a link release request carrying an Non-Access Stratum (NAS) identifier of the source UE sent by the source UE, the UE context modification request comprises the NAS identifier of the source UE, the link deletion message is an RRC message or a Media Access Control Control Element (MAC CE), and the link or radio bearer deletion message corresponding to the first service comprises the NAS identifier of the source UE or a PIT terminal identifier, or a radio bearer identifier corresponding to the first service; or after receiving the link release request carrying the NAS identifier of the source UE sent by the source UE, sending, by the base station, a link deletion message to the source UE, wherein the link deletion message is configured to indicate the source UE to delete the Uu link established with the base station or the radio bearer, the link release request is an RRC message or MAC CE, and the link or radio bearer deletion message corresponding to the first service comprises the NAS identifier of the source UE or the PIOT terminal identifier, or the radio bearer identifier corresponding to the first service.

17. A non-transitory computer-readable storage medium, storing a computer-executable instruction which, when executed by a processor, causes the processor to perform the method for service switch between User Equipments (UEs) of claim 1.

18. A non-transitory computer-readable storage medium, storing a computer-executable instruction which, when executed by a processor, causes the processor to perform the method for service switch between User Equipments (UEs) of claim 7.

* * * * *